United States Patent [19]

Cioni

[11] 3,750,376
[45] Aug. 7, 1973

[54] MOTORIZED LANDSCAPING MACHINE CARRYING ONE OR MORE LANDSCAPING APPLIANCES AND CAPABLE OF AUTOMATICALLY CIRCUMVENTING OBSTACLES

[76] Inventor: Paolo Cioni, Via dei Bassi 11, Firenze, Italy

[22] Filed: Nov. 22, 1971

[21] Appl. No.: 201,020

[30] Foreign Application Priority Data
Dec. 16, 1970 Italy .................................. 9789 A/70

[52] U.S. Cl. ............................. 56/10.4, 56/DIG. 15
[51] Int. Cl. .......................................... A01d 35/26
[58] Field of Search ...................... 56/10.4, DIG. 15

[56] References Cited
UNITED STATES PATENTS

| | | | |
|---|---|---|---|
| 2,838,901 | 6/1958 | Davis | 56/10.4 UX |
| 2,732,675 | 1/1956 | Smith et al. | 56/10.4 UX |
| 3,526,083 | 1/1970 | Barry et al. | 56/10.4 UX |
| 3,397,521 | 8/1968 | Danuser | 56/10.4 UX |
| 3,535,861 | 10/1970 | Fineman | 56/10.4 UX |

FOREIGN PATENTS OR APPLICATIONS

| | | | |
|---|---|---|---|
| 1,461,426 | 11/1966 | France | 56/10.4 |

Primary Examiner—Russell R. Kinsey
Assistant Examiner—J. A. Oliff
Attorney—John J. McGlew

[57] ABSTRACT

The landscaping machine includes a relatively elongated bearing arm arranged to be secured, at one end, to a motorized vehicle, having a power source, to project laterally from the vehicle, and a relatively elongated yoke is rotatably supported, at substantially its midpoint, on the opposite end of the arm for rotation in a substantially horizontal plane. At least one landscaping appliance is interchangeably mounted on an end of the yoke, and releasable stop means restrain the yoke to extend substantially parallel to the bearing arm and substantially perpendicular to the direction of movement of the motorized vehicle. A pivot or shaft, swingably supporting the yoke on the bearing arm, carries pulleys, one of which is connected by a belt to the power source on the motorized vehicle, and the other of which is connected by belts to pulleys driving the landscaping appliances. When an appliance strikes an obstacle in its path of movement, the releasable lock or restraining means releases the yoke for swinging in a direction to enable the appliance to circumvent the obstacle.

8 Claims, 2 Drawing Figures

MOTORIZED LANDSCAPING MACHINE CARRYING ONE OR MORE LANDSCAPING APPLIANCES AND CAPABLE OF AUTOMATICALLY CIRCUMVENTING OBSTACLES

FIELD OF THE INVENTION

This invention relates to landscaping machines and, more particularly, to a novel and improved motorized landscaping machine capable of circumventing obstacles in the path of landscaping appliances included in the machine.

BACKGROUND OF THE INVENTION

Those skilled in the prior art know the difficulty of operating a motorized machine, such as a mowing, harrowing, hoeing, levelling, or similar machine, when an artificial or natural fixed obstacle is positioned in the path of movement of the tool of the machine. When such an obstacle is encountered, the vehicle carrying the landscaping machine must be moved transverse to the direction of normal movement, in order to allow the landscaping tool or appliance of the machine to pass alongside the obstacle. All this involves maneuvers which are not at all simple or rapid, and which certainly are not automatic.

The problem is particularly important in the case of landscaping work to be done along the edges of roads and highways, where there are existing vertically oriented obstacles such as guard rail bases, road sign bases, parapets, vehicle-deflecting bumpers, plants, and the like.

SUMMARY OF THE INVENTION

The present invention is directed to a motorized machine which, by way of example, will be described as a mowing machine but which has many other useful purposes. The machine in accordance with the invention solves the problem of working continuously without requiring the lateral movements of the carrying or supporting motorized vehicle. The machine of the invention carries a working appliance, such as a rotary mowing blade, or may carry two working appliances of the same or different types. When there is any fixed obstacle in the path of the working appliance, as soon as this obstacle is struck head-on by the working appliance or by one of the other appliances, the appliance is deflected to circumvent the obstacle.

Such circumventing is made possible by the fact that the working appliance, or the two working appliances, are positioned at diametrically opposite positions at the respective extremities or ends of a yoke pivotal about a vertical central axis, in such a manner that, whenever the housing of one of the working appliances or operating elements strikes an obstacle frontally, this causes automatic rotation of the yoke through 360° divided by the number of operating appliances. This brings a second operating appliance alongside the obstacle and with its housing in contact with the obstacle, so that the motion of the overall machine can proceed regularly without stopping or without maneuvers to alter its main direction. The machine is thus able, at the same time, to continue its own work with continuity and accuracy.

An object of the invention is to provide an improved motorized landscaping machine.

Another object of the invention is to provide such a landscaping machine which, responsive to a working tool or appliance striking an obstacle, provides for the working tool or appliance to circumvent the obstacle.

A further object is to provide such a machine, for mounting on a motorized vehicle, and which permits the motorized vehicle to continue along a predetermined path, without maneuvering to avoid obstacles, while continuing to perform its work.

For an understanding of the principles of the invention, reference is made to the following description of a typical embodiment thereof as illustrated in the accompanying drawing.

DESCRIPTION OF THE PREFERRED EMBODIMENT

Figure 1:
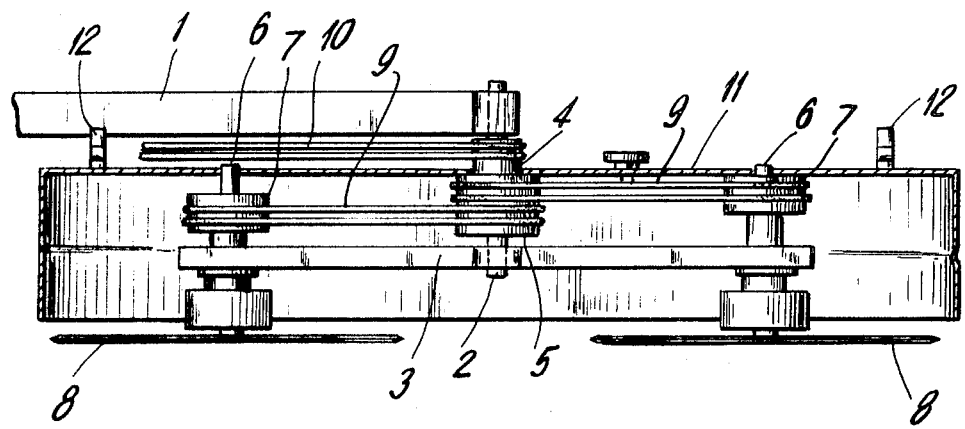
FIG. 1 is a side elevation view, partly in section, of a motorized landscaping machine embodying the invention.
Figure 2:
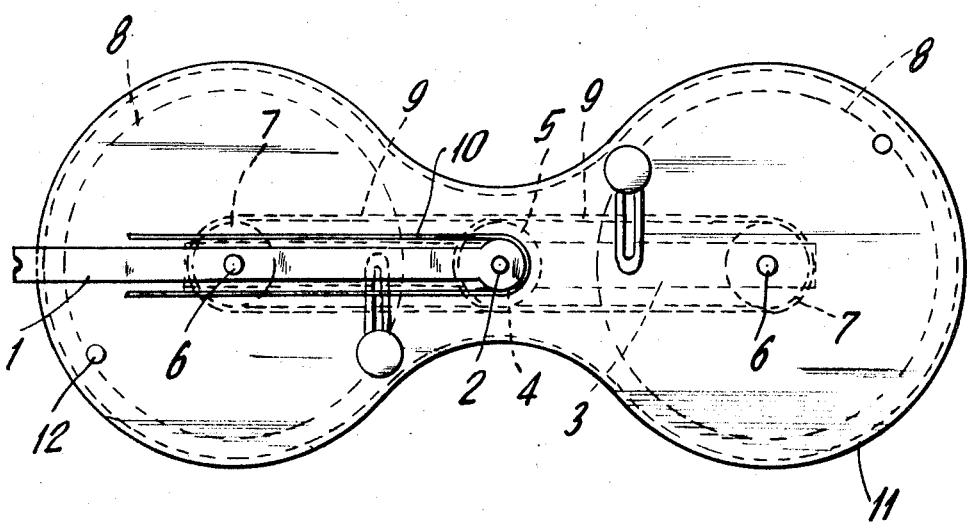
FIG. 2 is a top plan view of the machine shown in FIG. 1.

As stated, the invention will be described, by way of example only, as applied to a mower, but it will be understood that the principles of the invention are applicable equally to other types of landscaping machines, such as rollers, tampers, hoers, harrows, and the like.

Referring to the drawing, the mower, as reduced to its essential structure, comprises a bearing arm 1 constructed and arranged to have one end thereof secured to and supported by a motorized vehicle having a power source. The arm 1, when mounted on the motorized vehicle, is arranged to project laterally therefrom in cantilever fashion, and its opposite end supports a vertical shaft 2 which can rotate freely.

A horizontal yoke 3 is freely supported, at its midpoint, on shaft 2. Shaft 2 also mounts two grooved pulleys 4 and 5, preferably of different diameters. Both extremities of yoke 3 carry shafts 6 which are vertically oriented and which are freely rotatable. Each shaft 6 has secured to the upper end thereof a respective grooved pulley 7 and carries, at its lower end, a respective disc mowing blade 8.

Pulleys 7 are connected to pulley 5, for rotation responsive to rotation of pulley 5, by respective trapezoidal belts 9, and pulley 4 is connected to the power source of the motorized supporting vehicle (not shown), being driven by means of one or more trapezoidal belts 10 from the power source.

Blades 8 and the power transmission elements advantageously are positioned in and protected by a housing 11. Releasable stop devices 12 project upwardly from housing 11 at each end thereof, and serve as releasable restraining means blocking free rotation of yoke 3 relative to bearing arm 1. The releasable stop devices 12 are suitably arranged, for example, being hinged with a horizontal pin, to permit free rotation of the unit comprising yoke 3 and housing 11 in response to external pressure, such as that produced by housing 11 striking against an obstacle.

The arrangement operates in a manner which will now be described. The motorized supporting vehicle, carrying the bearing arm 1 projecting laterally from one of its two sides, moves along a predetermined path with yoke 3 being horizontal and oriented in such a manner that one of the two blades 8 is at the maximum distance from the motorized supporting vehicle and the other blade is at the minimum distance from the motorized supporting vehicle. Essentially, yoke 3 extends parallel to bearing arm 1. The blade 8 furthest from the supporting vehicle is the working blade, when only one of the two blades is operated, but there is nothing to prevent both blades from working at the same time. Whenever a fixed obstacle appears in the path of the blade 8 further from the supporting vehicle, housing 11, protecting this blade, will strike this obstacle from the front. This will effect automatic rotation of yoke 3 about shaft 2 by reaction to the forward movement of the motorized vehicle carrying the machine, and by self-rotation due to the frictional coupling between shaft 2 and yoke 3, in the same direction of rotation as that of shaft 2. In the case of the illustrated yoke 3 carrying only two working appliances, the yoke will rotate through an angle of 180° to bring the blade 8 which was nearer the supporting vehicle alongside the obstacle, thus allowing the work to continue without stopping or without maneuvering the vehicle carrying the working machine.

It should be understood that the rotary disc blades 8 are illustrated by way of example only, and may be interchanged with any other type of cutting tool. Furthermore, the cutting tools can also be interchanged, indiscriminately, with different elements having different functions, such as shovels, harrows, augers, levelling cylinders, or devices and similar tools used to perform landscaping operations other than cutting. In addition, while the yoke 3 has been shown as, in effect, having two arms extending in opposite directions from the axis of shaft 2, it should be understood that the yoke may comprise more than two arms, such as three arms, four arms, or any other practical number of arms. Also, while bearing arm 1 has been shown as a rectilinear member, it could, for example, be a triangular brace or the like extending laterally from the supporting machine.

Additionally, the shaft 2 with the pulleys 4 and 5 constitutes a rotor rotatable as a unit, so that the pulleys 6 are rotated in the same angular direction as is the pulley 4. Also, while a belt and pulley drive has been indicated for the invention machine, it will be understood that the belt and pulley drive could be substituted by a chain and sprocket drive, by a geared drive, by a fluid drive, or any other type of driving means. Furthermore, the shafts 6, in the event the working appliances are intended to be rotatable about horizontal axes, can be oriented horizontally rather than vertically at the ends of the respective arms of yoke 3. In such case, a bevel gearing could be provided in association with the rotor which includes the shaft 2. In such case, the shafts 6 with their pulleys 7 and belts 9 could be eliminated and replaced by suitable transmission gearing. With respect to the particular embodiment of the invention shown in the drawings, the relative diameters of the pulleys 4 and 5 can have any desired ratio with respect to each other in accordance with the desired speed of operation of the working appliances, such as the disc blades 8, and the diameters may be selected in accordance with the diameters of the disc blades.

While a specific embodiment of the invention has been shown and described in detail to illustrate the application of the principles of the invention, it will be understood that the invention may be embodied otherwise without departing from such principles.

What is claimed is:

1. A landscaping machine, arranged for mounting on a vehicle having a power source, and capable of circumventing obstacles in its path, said machine comprising, in combination, a relatively elongated bearing arm arranged to be fixedly supported only at one end, in cantilever fashion, in vertically spaced relation to the ground; a horizontally oriented yoke rotatably suspended, at substantially its midpoint, from the opposite free end of said bearing arm for rotation about a vertical axis, said bearing arm constituting the sole support of said yoke and said yoke including at least two horizontal and equiangularly spaced arms extending radially from its axis of rotation; at least one landscaping appliance interchangeably suspended from the free end of one of said yoke arms and supported solely by said one yoke arm; respective releasable detent means supported by said yoke at substantially uniform radial distances from its axis of rotation and each associated with a respective yoke arm; said detent means being engageable with said bearing arm to releasably restrain said yoke against rotation relatively to said bearing arm; and driving means, including a rotatable transmission at said free end of said bearing arm and rotatable coaxially with said yoke and connected to each appliance for driving each appliance from a power source connected to said rotatable transmission; said releasable detent means, when an appliance strikes an obstacle, disengaging from said bearing arm for releasing said yoke for rotation with said transmission in the direction of rotation of said transmission to enable said machine to circumvent the obstacle to continue operating while proceeding along a predetermined path without interruption; the freely cantilevered length of said bearing arm being sufficiently greater than the length of said yoke arms to provide clearance for rotation of said yoke through at least 360° about its axis of rotation.

2. A motorized landscaping machine, as claimed in claim 1, in which said driving means includes a first drive connecting said transmission to the power source; and second drives each connecting said transmission to a respective landscaping appliance.

3. A motorized landscaping machine, as claimed in claim 1, in which, when only one landscaping appliance is operative, it is located at a position furthest from the supporting vehicle.

4. A motorized landscaping machine, as claimed in claim 1, in which said transmission at said free end of said bearing arm comprises a rotor rotatably mounted at said free end; said rotor including a shaft rotatably mounting said yoke and first and second pulleys secured to rotate with said shaft; said driving means including first belt means connecting said first pulley to the power source and second belt means each connecting respective second pulleys to respective third pulleys each rotatable with a respective appliance; whereby all of said appliances are rotated in the same angular direction as said rotor.

5. A motorized landscaping machine, as claimed in claim 1, including housing means at least laterally enclosing each yoke arm, each landscaping appliance and the driving means connected thereto; said housing means being rotatable with said yoke arms; said releasable detent means being mounted on said housing means for cooperation with said bearing arm.

6. A motorized landscaping machine, as claimed in claim 5, in which said housing means is rotated with said yoke responsive to engagement of the portion of said housing means then furthest from the motorized vehicle with an obstacle; said releasable detent means restraining each such rotation of said housing means and said yoke to an angular displacement equal to 360° divided by the number of yoke arms; whereby, responsive to such engagement with an obstacle, the appliance then furthest from the supporting vehicle is rotated in a direction to clear the obstacle with the following appliance, considered in the direction of rotation of the yoke and said housing means, being brought into action alongside the obstacle.

7. A motorized landscaping machine, as claimed in claim 1, in which said appliances are mowing appliances; said yoke having two arms extending in diametrically opposite directions from the axis of rotation of said yoke; each yoke arm mounting a respective mowing appliance at its free end; each mowing appliance comprising a mowing blade rotatable about a vertical axis; said transmission comprising a rotor rotatably mounted at said free end of said bearing arm, and including a shaft rotatably supporting said yoke, and first and second pulleys secured to rotate with said shaft; a respective driven pulley coupled to each mowing appliance; said driving means including first belt drive connecting said first pulley to the power source for rotation of said first pulley in a selected angular direction, and including respective second belt drives each connecting respective second pulleys to respective driven pulleys for rotation of said driven pulleys in said selected angular direction; and a respective housing at least partially laterally enclosing said yoke, said mowing appliances and said second belt drives.

8. A motorized landscaping machine, as claimed in claim 7, in which said first and second pulleys have respective different diameters in accordance with the desired angular velocities of said mowing appliances.

* * * * *